Jan. 19, 1960 B. MEDENUS 2,921,567
SLOT-CONTROLLED TWO-STROKE CYCLE INTERNAL COMBUSTION ENGINE
Filed May 22, 1957 2 Sheets-Sheet 1

INVENTOR
Bernhard Medenus

Jan. 19, 1960  B. MEDENUS  2,921,567
SLOT-CONTROLLED TWO-STROKE CYCLE INTERNAL COMBUSTION ENGINE
Filed May 22, 1957  2 Sheets-Sheet 2

INVENTOR
Bernhard Medenus
By
Walter Guhrer
Patent Agent

United States Patent Office 2,921,567
Patented Jan. 19, 1960

2,921,567
SLOT-CONTROLLED TWO-STROKE CYCLE INTERNAL COMBUSTION ENGINE

Bernhard Medenus, Koln-Kalk, Germany, assignor to Klöckner-Humboldt-Deutz Aktiengesellschaft, Koln, Germany Application May 22, 1957, Serial No. 660,931

Claims priority, application Germany June 9, 1956

2 Claims. (Cl. 123—55)

The present invention relates to an air cooled slot-controlled two-stroke cycle internal combustion engine provided with scavenging passage means leading to the scavenging slots of the respective cylinder and communicating with a scavenging air receiving chamber. Said passage means may, if desired form a part of said scavenging air receiving chamber.

It is an object of this invention to provide a two-stroke cycle internal combustion engine of the above mentioned type, in which the heat developed in the crank-case will not be conveyed to the scavenging passage means and the scavenging air receiving chamber.

It is another object of this invention to provide a two-stroke cycle internal combustion engine of the type set forth in the preceding paragraph, which will be simple in construction and highly efficient in operation.

These and other objects and advantages of the invention will appear more clearly from the following specification in connection with the accompanying drawings in which.

The primary feature of the two-stroke cycle internal combustion engine according to the present invention consists in that that lower wall portion of the scavenging passage means which faces the crank-case of the engine and the lower wall portion of the scavenging air receiving chamber are designed as separate walls above the upper wall of the crank-case. According to a particularly advantageous design of the two-stroke cycle internal combustion engine according to the present invention, the said lower wall portions of the scavenging passage means and scavenging air receiving chamber and the upper wall of the crank-case confine with each other a chamber which is open toward the outside so as to allow the access of outside air thereto.

Figure 1:
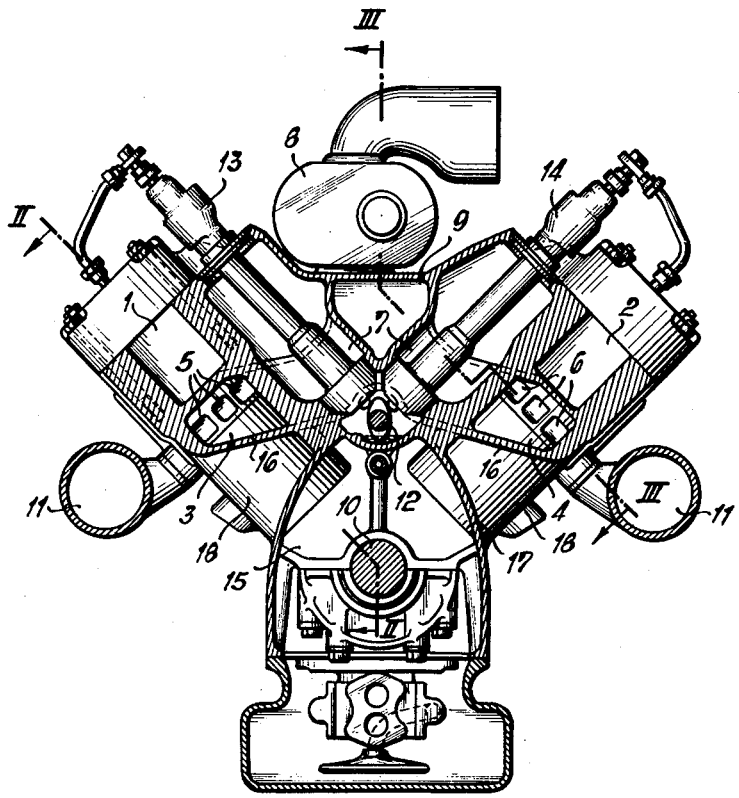
Fig. 1 is a vertical section through an air cooled slot-controlled two-stroke cycle internal combustion engine in conformity with the present invention, said section being taken along the line I—I of Fig. 2.
Figure 2:
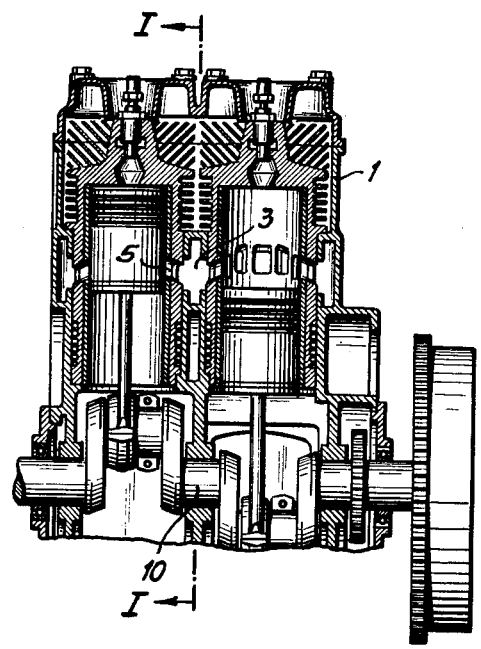
Fig. 2 is a section taken along the line II—II of Fig. 1.

Referring now to the drawings in detail, the air cooled two-stroke cycle internal combustion engine illustrated therein represents a V-engine in which one cylinder of one row and the adjacent cylinder of the other row of cylinders have a scavenging air passage in common. The section illustrated in Fig. 1 is so located that it passes through the scavenging air passage common to the adjacent cylinders of the two rows of cylinders.

The two cylinder rows of the engine are designated with the reference numerals 1 and 2. The scavenging conduits 3 lead to the cylinder row 1, whereas the scavenging conduits 4 lead to the cylinder row 2. The scavenging slots of the cylinders 1 are designated with the reference numeral 5, whereas the scavenging slots of the cylinder row 2 are designated with the reference numeral 6. The scavenging conduits 3 and 4 communicate with a scavenging air receiving chamber 7 which is located between the cylinder rows 1 and 2. The receiving effect of the scavenging air receiving chamber 7 extends into the scavenging conduits 3 and 4. The scavenging air is delivered by a Roots blower 8 which is mounted on a wall 9 covering the V-shaped chamber of the engine. The blower 8 is driven by the crankshaft 10 of the engine.

Figure 3:
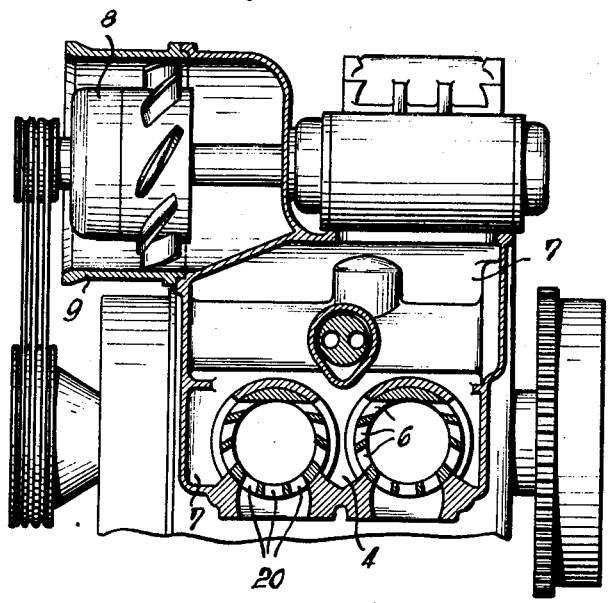
Fig. 3 is a section taken along the line III—III of Fig. 1.

The discharge slots 20 (Fig. 3) of the engine are directed toward both sides of the engine so that the discharge manifolds 11 (Fig. 1) are arranged on the outside of the engine. At the apex of the V-shaped chamber 7 there is provided a cam shaft 12 which serves for driving the fuel injection pumps 13 and 14. These pumps represent complete units by themselves and may be inserted into the engine as entities. Each cylinder has associated therewith one of said pumps.

The engine according to the invention is characterized in that that lower wall portion 16 of the scavenging conduits 3 and 4 which faces the crank-case 15, and also that lower wall portion of the scavenging air receiving chamber 7 which faces the crank-case 15 are designed as separate walls above the upper wall 17 of the crank-case. Thus, the wall portions 16 of the scavenging conduits 3 and 4 and the lower wall portion of the scavenging air receiving chamber 7 are separated from the crank-case walls 17 so that no heat developed in the crank-case 15 can be conveyed to the said wall portions 16 of said scavenging air conduits 3, 4 and the bottom of the scavenging air receiving chamber 7. It is particularly advantageous so to design said wall portions 16 and the bottom portion of the scavenging air receiving chamber 7 that the chambers 18 defined by the said wall portions 16 and bottom portions and upper walls 17 are open toward the outside. According to Fig. 1, each of the said chambers 18 has an angle-shaped cross section with the wider part of the angle opening toward the outside so that outside air can easily enter said chamber.

From the above it will thus be evident that the heat of the crank-case cannot be conveyed to the scavenging conduits and the scavenging air receiving chamber thereby preventing a reduction in the charge of the scavenging air during operation of the engine.

It is, course, to be understood that the present invention is, by no means, limited to the particular construction shown in the drawing but also comprises any modifications within the scope of the appended claims. Thus, while the engine illustrated in the drawing is a V-engine, the present invention is not limited to V-engines but may also be used in connection with other types if engines. While furthermore, the engine shown in the drawings, is an air-cooled engine, the invention may also advantageously be used in connection with water-cooled engines.

What I claim is:

1. In combination in an air cooled two-stroke cycle internal combustion engine having a crankcase: an engine block including at least two cylinders arranged in V-formation with regard to each other and provided with scavenging air slots, a scavenging air receiving chamber having its walls integral with said engine block, and scavenging air conveying conduit means establishing communication between said scavenging air receiving chamber and said scavenging air slots, that wall portion of said conduit means which faces said crankcase and that wall portion of said scavenging air receiving chamber which faces said crank-case being separate from the crank-case wall and being arranged outside thereof and in spaced relationship thereto while forming therewith cavities open toward the outside so as continuously to admit outside air into said cavities.

2. An air cooled two-stroke cycle internal combustion engine according to claim 1, in which the wall portions of said conduit means which face said crank-case are respectively inclined with regard to the adjacent wall portions of said crank-case so that the cavities formed thereby widen toward the outside thereof.

References Cited in the file of this patent

UNITED STATES PATENTS

| | | |
|---|---|---|
| 2,057,062 | Schneider | Oct. 13, 1936 |
| 2,115,180 | Schneider | Aug. 26, 1938 |
| 2,252,914 | Balton | Aug. 19, 1941 |
| 2,265,677 | Straub | Dec. 9, 1941 |
| 2,654,355 | Scheiterlein | Oct. 6, 1953 |

FOREIGN PATENTS

| | | |
|---|---|---|
| 726,317 | Germany | Oct. 10, 1942 |
| 718,661 | Great Britain | Nov. 17, 1954 |